United States Patent [19]

Brenholt

[11] 4,214,882

[45] Jul. 29, 1980

[54] PORTABLE AIR FILTER ASSEMBLY WITH PULSE JET SELF-CLEANING FILTERS

[75] Inventor: David L. Brenholt, Dundas, Minn.

[73] Assignee: Donaldson Company, Inc., Minneapolis, Minn.

[21] Appl. No.: 932,003

[22] Filed: Aug. 8, 1978

[51] Int. Cl.² .............................................. B01D 45/18
[52] U.S. Cl. ........................................ 55/302; 55/283; 55/323; 55/324; 55/418; 55/429; 55/472
[58] Field of Search ..................... 55/283, 302, 385 A, 55/472, 429, 481, 323, 324, 418

[56] References Cited

U.S. PATENT DOCUMENTS

| | | | |
|---|---|---|---|
| 581,912 | 5/1897 | Hunt | 55/320 |
| 2,788,198 | 4/1957 | Anderson | 64/2 R |
| 2,980,207 | 4/1961 | Allen | 55/283 |
| 3,394,532 | 7/1968 | Oetiker | 55/302 |
| 3,480,330 | 11/1969 | Hirs et al. | 55/343 |
| 3,837,150 | 9/1974 | Kubiak | 55/302 |
| 4,007,026 | 2/1977 | Groh | 55/302 |
| 4,058,379 | 11/1977 | Cheng | 55/302 |

FOREIGN PATENT DOCUMENTS

| | | | |
|---|---|---|---|
| 2528220 | 1/1976 | Fed. Rep. of Germany | 55/302 |
| 939641 | 10/1963 | United Kingdom | 55/484 |

*Primary Examiner*—Richard L. Chiesa
*Attorney, Agent, or Firm*—Merchant, Gould, Smith, Edell, Welter & Schmidt

[57] ABSTRACT

A self-cleaning air cleaner having a housing with a first partition dividing the interior of the housing into a first generally vertically elongated chamber and a second generally horizontally elongated chamber. The partition lies in an oblique plane at an angle with respect to the elongation axes of the first and second chambers and has an opening which provides fluid communication between the first and second chambers. A fan or blower is provided within the housing for drawing air through the housing from a dust-laden air inlet to a clean air outlet. A filter is mounted within the housing and disposed to filter the air passing through the opening in the partition. A reverse pulse air valve is disposed within the housing to direct a pulse of cleaning air into the filter to dislodge the dust collected thereon. An electrical control circuit is provided for actuating the reverse pulse air valve which is connected to a suitable source of compressed air. The air flow path through the cleaner is such that removal of dust from the filter as the reverse air pulse is introduced therein facilitated and the dust is conveniently collected in a dust collection hopper. The air cleaner is compact and has a low center of gravity and is therefore easily transportable from one industrial work location to another.

10 Claims, 8 Drawing Figures

PORTABLE AIR FILTER ASSEMBLY WITH PULSE JET SELF-CLEANING FILTERS

BACKGROUND OF THE INVENTION

The present invention relates broadly to an industrial air cleaner unit and in particular to a self-cleaning air cleaner unit designed as a compact relatively small package that can be easily moved from one work area to another as desired.

The prior art, including units manufactured by the assignee of the present invention, comprised units designed for the same general application as the present invention but which generally incorporated cloth bags as filters and were provided with means to manually agitate the bags when cleaning of the filters was needed. Additionally, in the prior art units the filters have been vertically mounted thereby substantially increasing the overall height of the units. The prior art units required frequent operator servicing to clean the unit filters and additionally were somewhat unwieldy and difficult to reposition to various work stations.

It is desirable to have a compact relatively small package unit that can be easily moved around a manufacturing plant by a single person and which has a self-cleaning feature to minimize servicing of the unit.

The present invention therefore includes a housing structure to provide a compact portable unit. A partition divides the interior of the housing into a substantially horizontally elongated filtering chamber and a substantially vertically elongated clean air chamber. The positioning of a dust-laden air inlet and a clean air outlet on the housing generates an air flow through the housing which facilitates the self-cleaning of the filter units. In the preferred embodiment of the invention, the filter elements utilized are conventional prior art pleated paper filters and reverse cleaning air pulse apparatus is disposed within the housing.

The present invention thus is an air cleaner having a compact housing and which incorporates the advantages of self-cleaning.

SUMMARY OF THE INVENTION

The present invention is a portable air cleaner that includes a housing having a dust-laden air inlet and a clean air outlet. A first partition is mounted within the housing to divide the interior of the housing into a first generally vertically elongated chamber and a second horizontally elongated chamber. The partition lies in an oblique plane at an angle with respect to the elongation axes of the first and second chambers and has an opening which provides fluid communication between the first and second chambers. The dust-laden air inlet opens into the horizontally elongated chamber while the clean air outlet opens into the vertically elongated chamber. Means are provided within the housing for drawing air through the housing from the dust-laden inlet to the clean air outlet. Finally, filter means are mounted within the housing for filtering the air passing through the opening in the partition.

In the preferred embodiment means are disposed within the housing for cleaning the filter means of the dust collected thereon. In the preferred embodiment the filter means is a cylindrical filter member having an inner passageway along its central axis and an annular filter element providing filtered fluid communication between the horizontally elongated chamber and the inner passageway. The inner passageway is in fluid communication with the vertically elongated chamber through the opening and the partition. The means for cleaning the filter includes the reverse pulse air means disposed within the housing for automatically and periodically introducing reverse pulses of compressed air into the axial inner passageway of the filter member.

In the preferred embodiment, a second substantially vertically oriented partition is disposed within the horizontally elongated chamber dividing the chamber into a first chamber portion and a second chamber portion. The second partition has a relatively large opening therein and a plurality of relatively small apertures. The second partition functions as a diffuser to insure even distribution of air flow across the filter member within the second chamber portion such that when the reverse pulse is introduced into the filter member the evenly distributed air flow thereacross facilitates removal of dislodged dust therefrom. A tubular member is provided to connect the relatively large opening in the second partition with the opening in the first partition thereby providing a fluid passageway between the second portion of the horizontally elongated chamber and the vertically elongated chamber through the axial passageway of the filter member. The means for drawing air through the housing includes a fan or blower mounted in the vertically elongated clean air chamber.

Additionally, removably mounted to the housing and opening into the second chamber portion along the bottom thereof is a dust collection hopper. The dust deposited on the filter member that is periodically dislodged therefrom collects in the hopper. The operator maintenance or service required in the unit of the present invention is primarily the periodic removal of the dust collection hopper and dumping of the collected dust. The filter members need not be manually cleaned in the present invention. In the preferred embodiment a pair of such filter members are disposed within the second portion of the horizontally elongated chamber with the tubular members having central axes parallel to each other and which lie in a horizontal plane. A pair of openings in the second partition and the first partition are provided with associated connecting tubular members such that fluid passageway is provided between the inner axial passageways of the filter members and the vertically elongated clean air chamber.

From the above description, it can be seen that the present invention provides a truly portable self-cleaning air cleaner in a relatively compact package. The air flow through the partition housing facilitates removal of dust collected on the filters upon initiation of the reverse pulse of cleaning air. The fan blower is vertically mounted in the vertically elongated chamber proximate the bottom of the housing thereby lowering the center of gravity of the unit providing for a more stable portable package. The unit and packaging thereof optimizes the dust collection and at the same time minimizes operator maintenance by virtue of its self-cleaning feature. These and other advantages of the present invention will become apparent with reference to the accompanying drawings, detailed description of the preferred embodiment and claims.

DETAILED DESCRIPTION OF THE PREFERRED EMBODIMENT

Figure 1:
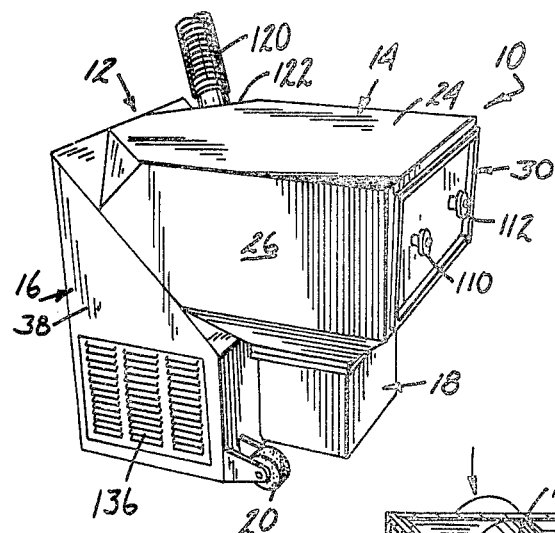
FIG. 1 is a view in perspective of the air cleaner of the present invention.

Referring to the drawings, wherein like numerals represent like parts throughout the several views, FIG. 1 is a view in perspective showing the portable self-cleaning air cleaner of the present invention designated generally as 10. Air cleaner 10 includes a housing 12 with an upper housing member 14 which is elongated substantially in the horizontal direction and a lower housing member 16 which is elongated substantially in the vertical direction. Removably attached to housing member 14 at the bottom thereof is a dust collection hopper 18. A pair of wheels 20 and 22 are mounted to lower housing member 16 proximate dust collection hopper 18 to facilitate relocation of air cleaner 10 to work areas where it may be most needed at a particular time.

Upper housing member 14 includes a top wall 24, side walls 26 and 28, and an open end which is enclosed by removably mounted access panel 30. Housing member 14 also has an inwardly and downwardly sloping bottom wall 32 with an opening at 34 through which collected dust passes into hopper 18. The end of housing member 14 opposite access panel 30 is mounted to lower housing member 16 as will be described in more detail hereafter. Housing member 16 includes an end wall 36, side walls 38 and 40 and a bottom wall 42 and end wall 44.

Figure 2:
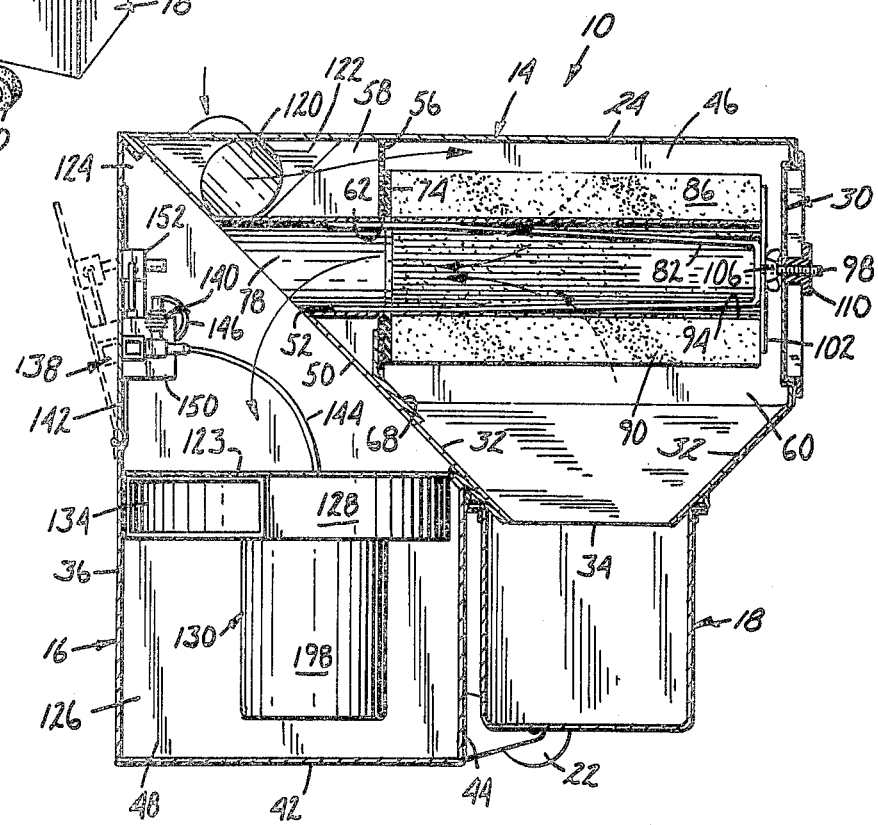
FIG. 2 is a sectional view in side elevation of the air cleaner of FIG. 1.
Figure 3:
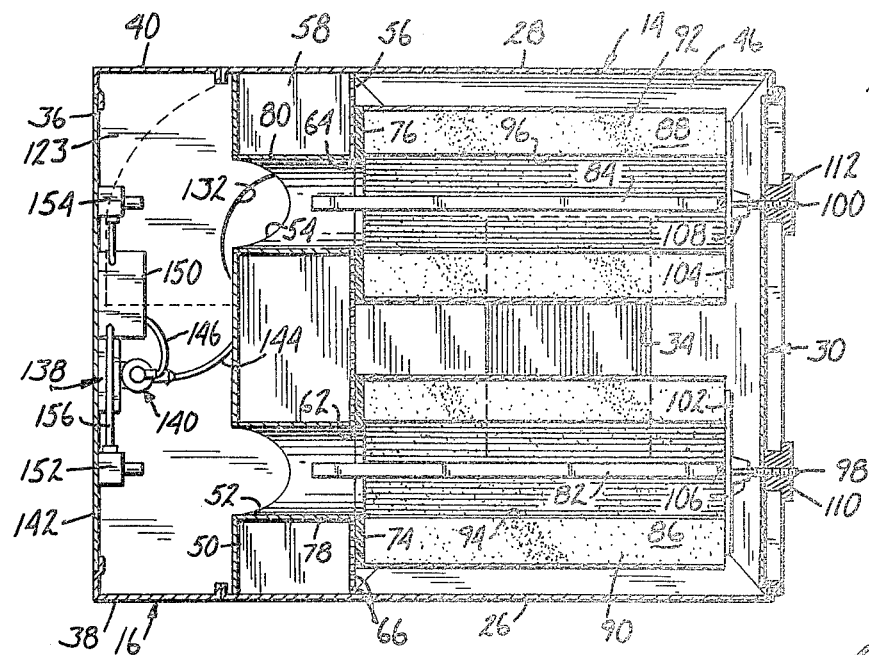
FIG. 3 is a sectional top plan view of the air cleaner of FIG. 1.

As can be seen in more detail in FIG. 2, upper housing member 14 defines a chamber 46 having a substantially horizontally oriented elongation axis. On the other hand, housing member 16 defines a chamber 48 having a substantially vertically oriented elongation axis; the elongation axes of chambers 46 and 48 thereby are disposed substantially perpendicular to each other. Housing members 14 and 16 are joined to each other along an oblique plane, or a plane defined as angularly oriented or disposed with respect to horizontal and vertical axes passing therethrough. Lying in this oblique plane and separating chambers 46 and 48 is a first partition plate 50 mounted within housing 12. As illustrated specifically in FIG. 3, in the preferred embodiment partition plate 50 has a pair of openings 52 and 54 therein to provide fluid communication between chambers 46 and 48. Affixed to partition plate 50 and top wall 24 within chamber 46 and disposed generally in a vertical plane is a second partition plate 56. Partition plate 56 divides chamber 46 into a first chamber portion 58 and a second chamber portion 60. Second partition plate 56 has a pair of large openings 62 and 64 therein which are aligned with openings 52 and 54, respectively. Partition plate 56 also has a plurality of smaller apertures 66 therein and plate 56 functions as a diffuser as will be described in more detail hereafter.

Figure 4:
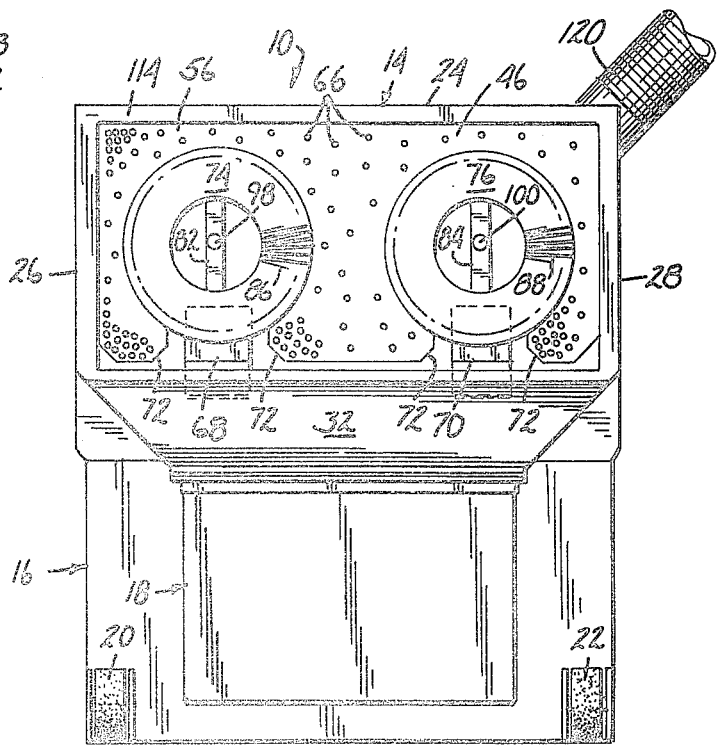
FIG. 4 is an end view in elevation of the air cleaner of FIG. 1 with an access panel removed.

As shown in more detail in FIG. 4, partition plate 56 is affixed to partition plate 50 by a pair of tabs 68 and 70. Portions of partition plate 56 are cut away as indicated at 72 to provide an opening along the bottom edge of plate 56 connecting chamber portions 58 and 60. A pair of annular disc-like filter mounting plates 74 and 76 are mounted to partition plate 56 about openings 62 and 64. A pair of tubular members 78 and 80 are affixed to plates 50 and 56 and provide a fluid passageway between openings 62 and 52 and openings 54 and 64, respectively. Opposite ends of tubular member 78 are affixed about openings 52 and 62 while opposite ends of tubular member 80 are affixed about openings 54 and 64. The fluid passageway defined by tubular members 78 and 80 are sealed from first chamber portion 58. Affixed to tubular members 78 and 80 proximate openings 62 and 64 are a pair of filter mounting yokes 82 and 84 that extend into chamber portion 60. A pair of filters 86 and 88 are mounted about yokes 82 and 84. Filters 86 and 88 may be conventional pleated paper filters that include annular filter elements 90 and 92, each having an inner axial passageway 94 and 96, respectively. Threaded members 98 and 100 extend from the ends of mounting yokes 82 and 84, respectively. Filters 86 and 88 are fastened against mounting plates 74 and 76 by end caps 102 and 104 tightened against annular filter elements 90 and 92 by wing nuts 106 and 108. Filters 86 and 88 are thereby sealed at opposite ends by mounting plates 74 and 76 and end caps 102 and 104. Fluid communication between axial passageways 94 and 96 and second chamber portion 60 is therefore solely through annular filter elements 90 and 92. Tubular members 78 and 80 in conjunction with filters 86 and 88 thereby define a pair of fluid passageways having generally horizontally disposed axes and which provide filtered fluid communication between second chamber portion 60 and chamber 48 through openings 52 and 54.

Figure 5:
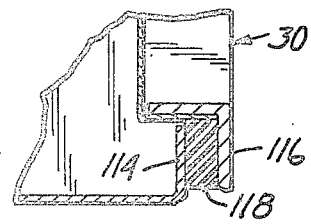
FIG. 5 is an enlarged fragmentary sectional view illustrating the seal between the air cleaner housing and the access panel.

Access panel 30 is secured by internally threaded knob 110 and 112 which are received on threaded extension members 90 and 100. FIG. 5 illustrates the preferred manner of providing an airtight seal for access panel 30. Specifically, side walls 26 and 28, top wall 24, and bottom wall 32 are provided with a flange portion, as shown at 114. Access panel 30 has a complementary flange portion 116. A gasket 118 is disposed between complementary flange portions 114 and 116 and may be firmly attached to either. When access panel 30 is tightened by knobs 110 and 112, gasket 118 may be compressed somewhat to provide an airtight seal for second chamber portion 60.

Housing 12 is provided with at least one dust-laden air inlet 120 which opens into first chamber portion 58. In the preferred embodiment, dust-laden air inlet 120 is disposed in a mitered corner 122 of housing 12. It is understood that more than one such dust-laden air inlet may be provided as shown in FIG. 1 or that the positioning of the dust-laden air inlet may be varied as long as the air inlet opens into chamber portion 58.

A fan sheet 122 divides chamber 48 into an upper section 124 and a lower section 126. Affixed to fan sheet 122 is a fan housing 128 in which is mounted a fan or blower designated generally as 130. Fan 130 is mounted vertically within lower section 126. An opening 132 is provided in fan sheet 122 through which air in upper section 124 is drawn into fan housing 128. Fan housing 128 also has an opening at 134 through which air drawn from upper section 124 is blown into lower section 126. Side wall 38 of lower housing member 16 is provided with a louvered panel 136 through which clean air is exhausted from housing 12. Fan 130 may be any conveniently sized unit and is typically electrically powered.

Mounted within upper section 124 of chamber 48 is a filter self-cleaning apparatus designated generally as 138. Self-cleaning apparatus 138 includes a small capacity compressor 140, which will be described in more detail hereafter, mounted to a removable (as shown by the dashed lines in FIG. 2) panel 142 of rear wall 36. Panel 142 can be secured to rear wall 36 by any convenient prior art means or hinged thereto. Compressor 140 is driven by a flexible shaft 144 connected to the rotating shaft of fan or blower unit 130. The compressed air output of compressor 140 is fed through a line 146 to a small capacity accumulator 150 also mounted to panel 142. A pair of reverse flow valves 152 and 154 are mounted on panel 142 and aligned generally with the axes of the axial passageways formed by tubular member 78 and filter 86 and tubular members 80 and filter 88, respectively. Valves 152 and 154 are thus disposed to direct pulses of cleaning air through openings 52 and 54 and thus into axial passageways 94 and 96.

Valves 152 and 154 are connected by lines, one of which is shown at 156, to accumulator 150. In the preferred embodiment, a pressure switch (not shown) is mounted within accumulator 150 and control means are provided to alternately actuate valves 152 and 154 when the pressure within accumulator 150 reaches a predetermined value. Valves 152 and 154 are conventional electrically actuated reverse pulse valves well-known in the prior art.

Figure 6:
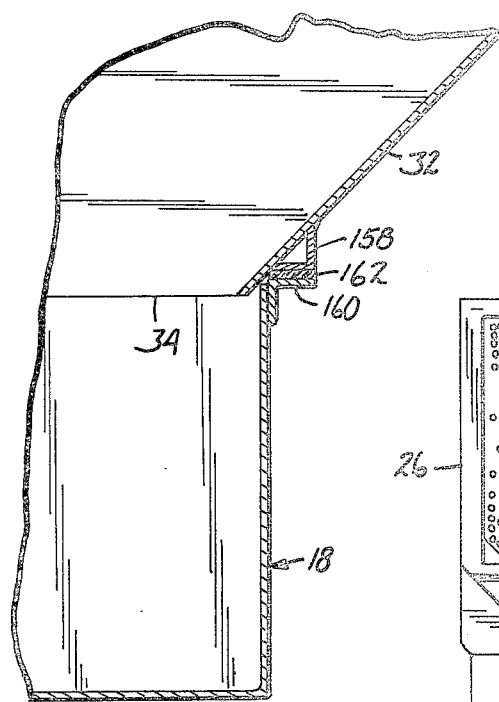
FIG. 6 is an enlarged fragmentary sectional view illustrating the seal between the air cleaner housing and the dust collection hopper.

Hopper 18 may be removably connected to bottom wall 32 by any convenient prior art means. FIG. 6 illustrates a means for providing an airtight seal between hopper 18 and bottom wall 32. Mating flange portions 158 and 160 are mounted to bottom wall 32 proximate opening 34 and hopper 18 proximate the top thereof, respectively. A sealing gasket 162 is disposed between flange portions 158 and 160. It will be understood that gasket 162 may be affixed to either flange portion 158 or flange portion 160. A suitable means for securing hopper 18 to bottom wall 32 can provide compressive force of flange portions 158 and 160 on gasket 162 to ensure an airtight seal. Hopper 18 is disclosed in the preferred embodiment as a rigid dust collection structure, however it is understood that it is contemplated within the spirit and scope of the present invention that hopper 18 may be a wire basket or cage which supports a plastic disposable bag in which dust is collected.

Figure 7:
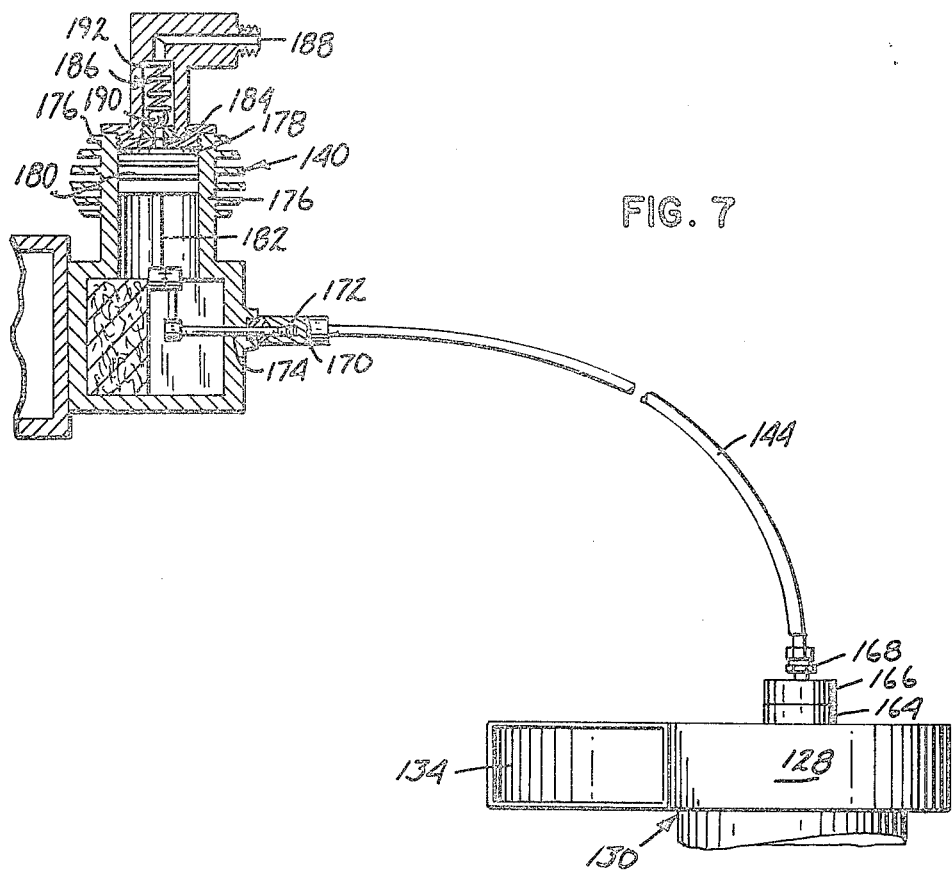
FIG. 7 is an enlarged view illustrating the connection between the compressor and fan with the compressor shown in section.
Figure 8:
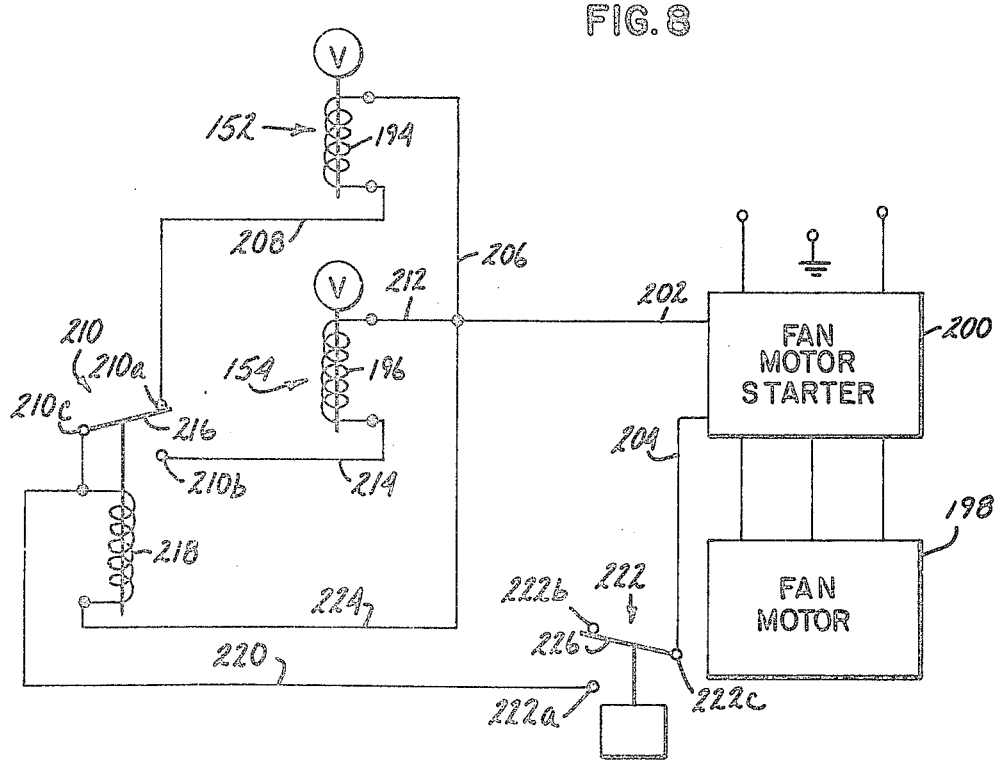
FIG. 8 is a schematic diagram of the electrical control circuit of the air cleaner of the present invention.

FIGS. 7 and 8 illustrate in more detail small capacity compressor 140, its connection to fan 130, and the electrical control circuit for timing the short burst of cleaning air from valves 152 and 154. In FIG. 7 the hub of the rotating shaft of fan 130 is designated generally as 164. An adapter plate 166 is affixed to hub 164 by convenient means such as welding or screw-type fastening means. Affixed to adapter plate 166 is a conventional swagelok fitting 168. Flexible shaft 144, which may be selected from any convenient prior art design commercially available, is secured to plate 166 by fitting 168. The opposite end of flexible shaft 144 is provided with an internally threaded coupling member 170 which receives a threaded extension 172 of a rotating shaft 174 of small capacity compressor 140. Compressor 140 includes a cylinder head 176 with a compression chamber 178 disposed therein. A piston 180 is mounted for reciprocation within chamber 178 and is connected by a rod and crank mechanism 182 to shaft 174. Cylinder head 176 has a restricted compressed air outlet passageway 184. Air outlet passageway 184 is in fluid communication through a check valve 186 to compressed air outlet 188 to which line 146 to accumulator 150 is connected. Check valve 186 includes a ball 190 biased to close restricted outlet 184 by a spring 192. Rotation of hub 164 of fan 130 is transmitted by flexible shaft 144 to shaft 174. Rotation of shaft 174 causes the reciprocation of piston 180 thereby compressing the air in chamber in 178. Upon each compression stroke of piston 180, ball 190 is lifted from its seat thereby permitting the compressed air to exit to outlet 188 and through line 146 to accumulator 150.

FIG. 8 illustrates schematically the control of reverse pulse air valves 152 and 154. Valves 152 and 154, as previously described, are conventional reverse pulse valves and are illustrated in FIG. 8 as solenoid-actuated valves with coils 194 and 196, respectively. A fan motor 198 associated with fan 130 is shown in block diagram form and is connected through a fan motor starter 200 to a source of AC power. Coils 194 and 196 are also connected to the source of AC power through lines 202 and 204 such that valves 152 and 154 cannot be energized unless motor 198 is on. The design of fan motor starter 200 is considered to be within the knowledge of one having ordinary skill in the art. One side of coil 194 is connected to line 202 by line 206. The opposite side of coil 194 is connected by line 208 to a terminal 210a of a stepping relay 210. One side of coil 196 is connected to line 202 by line 212. The opposite side of coil 196 is connected by line 214 to a terminal 210b of stepping relay 210. Stepping relay 210 has a switch arm 216 connected to a common terminal 210c. Terminal 210c is connected to one side of stepping relay coil 218 and by line 220 to a terminal 222a of a pressure switch 222. The opposite side of coil 218 is connected by line 224 to line 202. Pressure switch 222, which may be any conventional switch for detecting the pressure within accumulator 150, includes an off terminal 222b and a common terminal 222c. Terminal 222c provides a return path of power transmission through starter 200 from the source of AC power. Pressure switch 222 has a switch arm 226 connected to terminal 222c and movable between terminals 222a and 222b.

The operation of the present invention will now be described. Air cleaner 10 is started by energizing fan 130. The fan motor is connected to a suitable source of AC power (not shown). Fan 130 drives compressor 140 which begins to pump compressed air into accumulator 150. Fan 130 draws dust-laden air through inlet 120 into first chamber portion 58. Dust and debris entrapped in the air which is larger in size than apertures 66 in partition plate 56 pass through plate 56 at cutouts 72 and into hopper 18 under the effects of gravity and the air flow through chamber 46. Smaller dust particles pass through apertures 66 into second chamber portion 60. The air is drawn through filters 86 and 88 with the dust being deposited on filter elements 90 and 92. The filtered air passes into axial passageways 94 and 96, through tubular members 78 and 80, and through openings 62 and 64 into clean air chamber 48. The cleaned air is drawn through housing 28 and blown from housing 12 through louvered panel 136. As will be described in more detail with respect to the electrical controls, when the pressure in accumulator 150 reaches a predetermined value, one of valves 152 or 154 is opened and a pluse of compressed air stored in accumulator 150 is directed through opening 52 or 54 into axial passageway 94 or 96. The pulse of compressed air tends to expand within tubular members 78 and 80 creating a venturi effect which induces additional reverse air flow. The pulse of cleaning air expands outward through filter elements 90 and 92 from axial passageways 94 and 96 dislodging the accumulated dust thereon. The dust dislodged from filters 86 and 88 is collected in hopper 18. Air continues to be drawn into cleaner 10 during the reverse pulse of clean air and the air flow through housing 46 sweeps across filters 86 and 88 facilitating the removal of the dust from elements 90 and 92 and the collection of the dust in hopper 18. The greater volume of dislodged dust is carried away from the filter into hopper 18 while some of the dust may be redeposited on the filter toward its end proximate cap 102. On the next successive clean air pulse the redeposited dust will again be dislodged from the filter and collected in hopper 18. Partition plate 56 with aperture 66 serves as a diffuser of the air flow from chamber portion 58 into chamber portion 60 to ensure uniform flow through chamber 46.

In the preferred embodiment, valves 152 and 154 are alternately opened. Thus, the successive pulses of reverse flow cleaning air alternate back and forth between filters 86 and 88. Although it is not shown, a vertical separator sheet can be disposed within chamber portion between filters 86 and 88. Such separator sheet would tend to minimize the cross entrapment of dust dislodged from one filter onto the other filter. The separator sheet could also serve the additional function of providing structural support for top wall 24.

In the preferred embodiment, as previously mentioned, self-cleaning apparatus 138 is mounted on a removable panel 142 to facilitate maintenance and repair of apparatus 138. In the preferred embodiment, the inside of louvered panel 136 can also be covered with an open cell foam which acts as a diffuser for the clean air exiting through panel 136. Lower section 126 of chamber 48 may also be lined with a closed cell acoustic foam to reduce sound generated by cleaner 10.

Referring specifically to FIG. 8, the operation of the electrical control of valves 152 and 154 will now be described. With switch arm 226 of pressure switch 222 in the position shown contacting terminal 222b, valves 152 and 154 remain closed and relay 210 is not energized. When pressure switch 222 senses a predetermined pressure within accumulator 150, switch arm 226 is moved to terminal 222a completing a circuit path from line 202 to line 224 through coil 218 of relay 210, through line 220, switch 222 and line 204. With stepping relay 210 thus energized, switch arm 216 would change position from terminal 210a as shown to terminal 210b. Thus, a circuit is also established from line 202 through line 212 to coil 196, through line 214, relay 210, line 220, pressure switch 222 to line 204. Valves 152 and 154 are typically solenoid-type valves and upon introduction of current into coil 196 the valve is opened introducing a pulse of cleaning air from accumulator 150. As can be seen, coil 194 of valve 152 remains unenergized and thus valve 152 remains closed. Upon reduction of pressure in accumulator 150, switch arm 226 of pressure switch 222 returns to terminal 222b breaking the circuit and deenergizing coil 196 and coil 218. Valve 152 is closed and switch arm 226 is positioned in contact with terminal 222b. After the reverse pulse air valve closes the pressure in accumulator 150 begins to build once again.

When the pressure reaches the predetermined value, switch 222 is activated and switch arm 226 is moved to contact terminal 222a. Stepping relay 210 is energized and switch arm 216 is thereby disconnected from terminal 210b and connected to terminal 210a. A circuit is thereby completed from line 202 through line 206, coil 194 of valve 152, line 208, stepping relay 210, line 220 and switch 222 to line 204. With coil 194 thus energized, valve 152 is opened and a reverse pulse of cleaning air is introduced into the other of filters 86 and 88. It can be seen that stepping relay 210 provides for the alternating opening of valves 152 and 154 as pressure switch 222 detects the predetermined accumulated pressure within accumulator 150. In the preferred embodiment it is contemplated that accumulator 150 may have a volumne of approximately 0.2 cubic feet. Additionally, a typically actuating pressure may be approximately 90 psi. Compressor 140 may be selected to have a capacity on the order of 0.05 cubic inches. Compressor 140 is operative at all times while fan 130 is running. With an accumulator having 0.2 cubic foot capacity it has been noted that it takes 10 to 12 minutes to fill the accumulator to 90 psi for the initial cleaning air pulse. Thereafter the pulses are generated at approximately 2-minute intervals since the pressure within the accumulator 150 remains relatively high after each pulse with a pulse duration of approximately 15 milliseconds. Pressure switch 222 and stepping relay 210 can be selected from commercially available devices. For example, one suitable stepping relay is a 12-step relay with alternate steps connected in series.

From the above description, it can be seen that the present invention is an improved portable air cleaner which establishes a flow pattern from the dust-laden air inlet through a diffuser partition across dust-collecting filters facilitating reverse pulse dislodged dust movement into a dust collection hopper. The reverse pulses are directed through tubular members which serve as flow inducing venturis during the pulse cleaning operation. Two filter elements may be mounted generally horizontally and side-by-side permitting maximum reduction in overall height and volume. A removable closure panel provides for ease of servicing the filter elements. The reverse pulse apparatus is mounted on a removable panel in a clean air chamber also facilitating maintenance of the unit. The fan is mounted vertically in the clean air chamber lowering the center of gravity of the unit and providing for clean air exhaust into the base of the unit for acoustic control. Housing 12 includes three major subassemblies, upper housing member 14, lower housing member 16 and partition plate 50 to minimize production costs and provide for a modular molded plastic structure. The provision of a small capacity compressor integral with the air cleaner and which is driven by the fan motor eliminates the need for an external source of compressed air thereby making the air cleaner of the present invention truly portable. Although in the preferred embodiment the power takeoff to drive the compressor from the fan is disclosed as a flexible shaft, it is understood that the compressor could be mounted within the housing such that a rigid power takeoff shaft can be utilized to connect the hub of the fan to the shaft of the small capacity compressor. The flexible drive shaft, however, facilitates the mounting of the compressor on the removable back panel of the housing to simplify maintenance of self-cleaning apparatus 138. The compressor and accumulator capacity specifically disclosed above are, it is understood, simply representative of typical suitable values.

I claim:

1. A portable air cleaner comprising:
   (a) a housing having a dust-laden air inlet and a clean air outlet;
   (b) a first partition mounted within said housing dividing the interior thereof into a first generally vertically elongated chamber and a second generally horizontally elongated chamber, said partition lying in an oblique plane at an angle with respect to the elongation axes of said first and second chambers, said partition having an opening therein providing fluid communication between said first and second chambers with said air inlet opening into second chamber and said air outlet opening into said first chamber;
   (c) means within said housing for drawing air through said housing from said dust-laden air inlet to said clean air outlet;
   (d) an elongated filter member mounted within said second generally horizontally elongated chamber having a horizontally disposed elongation axis, said filter member having an inner axial passageway along said elongation axis and a filter element providing filtered fluid communication between said inner axial passageway and said second chamber; said filter member mounted to said first partition such that said opening in said partition provides fluid communication between said inner axial passageway and said first vertically elongated chamber, and
   (e) means mounted within said housing for periodically and automatically cleaning said filter member, said cleaning means further comprising:
      (i) valve means mounted within said first chamber for directing pulses of compressed cleaning air through said opening in said partition and into said inner passageway of said filter member whereby dust is dislodged from said filter element;
      (ii) means for controlling the opening and closing of said valve means; and
      (iii) means for connecting said valve means to a source of compressed air.

2. A self-cleaning portable air cleaner comprising:
   (a) a housing having a dust-laden air inlet and a clean air outlet;
   (b) a first partition mounted within said housing dividing the interior thereof into a first generally vertically elongated chamber and a second generally horizontally elongated chamber, said partition lying in an oblique plane at an angle with respect to the elongation axes of said first and second chambers, said partition having first and second openings therein providing fluid communication between said first and said second chambers; said air inlet opening into said second chamber and said air outlet opening into said first chamber;
   (c) a second partition vertically disposed within said second chamber and mounted to said first partition to divide said second chamber into a first chamber portion and a second chamber portion, said air inlet opening in said first chamber portion, said second partition having first and second openings horizontally spaced therein and a plurality of smaller apertures sized to permit passage of air and relatively small dust entrapped therein from said first to said second chamber portions;
   (d) first and second tubular members having horizontally disposed central axes mounted to said first and second partitions in said first chamber portion, said first and second tubular members providing fluid communication between said first and second openings in said first partition and said first and second openings in said second partition;
   (e) first and second filter members mounted within said second chamber portion, each of said filter members having an inner axial passageway and a filter element that provides filtered fluid communication between said inner axial passageways and said second chamber portion; said first and second filter members having horizontally disposed elongation axes lying in a common horizontal plane within said second chamber portion and secured to said second partition whereby said inner axial passageways are in fluid communication with said first and second tubular members through said first and second openings in said second partition;
   (f) means within said housing for drawing air through said housing from said dust-laden air inlet to said clean air outlet;
   (g) reverse pulse air valve means mounted within said housing for periodically introducing a reverse pulse of compressed air into said inner passageways of said first and second filter members whereby dust is dislodged from said annular filter elements;
   (h) electrical control means for regulating the opening and closing of reverse pulse air valve means; and
   (i) means for connecting said reverse pulse air valve means into a source of compressed air.

3. A self-cleaning portable air cleaner in accordance with claim 2 wherein said electrical control means includes means for alternately pulsing said first and said second filter means in succession.

4. A self-cleaning portable air cleaner in accordance with claim 3 wherein said first and second filter members are cylindrical with said inner passageway disposed along the central axes thereof and wherein said filter element is an annular pleated paper member.

5. A self-cleaning portable air cleaner in accordance with claim 4 comprising a removable dust collection hopper mounted to said housing and opening into said second chamber portion whereby dust dislodged from said filter element is deposited therein.

6. A self-cleaning portable air cleaner comprising:
   (a) a housing having a first portion with a central elongation axis substantially vertically aligned, said first portion defining a clean air chamber; said housing having a second portion with a central elongation axis substantially horizontally aligned, said second portion defining a filtering chamber; said first portion having a clean air outlet opening into said clean air chamber and said second portion having a dust-laden air inlet opening into said filtering chamber;
   (b) a first partition mounted within said housing and separating said first chamber from said second chamber, said partition lying in an oblique plane disposed at an angle with respect to said vertical and said horizontal elongation axes, said first partition having an opening therein providing fluid communication between said filtering and said clean air chambers;

(c) a cylindrical filter member having a central elongation axis substantially parallel to the elongation axis of said second portion of said housing and disposed within said filtering chamber, said filter member having a central axial passageway and an elongated annular filter element providing filtered fluid communication between said filtering chamber and said axial passageway, said filter member mounted with said axial passageway in fluid communication with said clean air chamber through said opening in said first partition;

(d) means for drawing air through said housing from said dust-laden air inlet to said clean air outlet; and (e) reverse pulse air means disposed within said clean air chamber for introducing a reverse pulse of compressed air into said axial passageway of said filter member whereby dust is dislodged from said annular filter element.

7. A self-cleaning portable air cleaner in accordance with claim 6 comprising:

(a) a substantially vertically oriented second partition disposed within said filtering chamber dividing said filtering chamber into a first chamber portion and a second chamber portion, said second partition having an opening therein horizontally and vertically aligned with said opening in said first partition, said second partition also having a plurality of relatively small apertures; and (b) a tubular member connected between said opening in said first partition and said opening in said second partition providing a fluid passageway therebetween, said reverse pulse air means disposed to direct said reverse pulse of compressed air into said tubular member through said opening in said first partition.

8. A self-cleaning portable air cleaner in accordance with claim 7 comprising a dust collection hopper removably mounted to said second portion of said housing and vertically disposed beneath said filter member, said second portion of said housing having an opening in the bottom surface thereof to discharge collected dust into said collection hopper.

9. A self-cleaning portable air cleaner in accordance with claim 8 wherein said reverse pulse air means comprises:

(a) an electrically operated valve connected to a source of compressed air; and (b) control means for periodically opening and closing said electrically operated valve.

10. A self-cleaning portable air cleaner in accordance with claim 9 comprising a compressed air accumulator mounted within said first portion of said housing and in fluid communication with said electrically actuated valves, said control means including means responsive to the pressure within said compressed air accumulator to open said valve upon detection of predetermined pressure value.

* * * * *

UNITED STATES PATENT AND TRADEMARK OFFICE
CERTIFICATE OF CORRECTION

PATENT NO. : 4,214,882
DATED : July 29, 1980
INVENTOR(S) : David L. Brenholt

It is certified that error appears in the above-identified patent and that said Letters Patent are hereby corrected as shown below:

Column 9, line 65 (at claim 2(c)): "in" should be --into--.

Signed and Sealed this

Thirtieth Day of December 1980

[SEAL]

Attest:

SIDNEY A. DIAMOND

Attesting Officer

Commissioner of Patents and Trademarks